United States Patent
Lee

(10) Patent No.: US 8,125,496 B2
(45) Date of Patent: Feb. 28, 2012

(54) APPARATUS AND METHOD OF CONVERTING IMAGE SIGNAL FOR FOUR-COLOR DISPLAY DEVICE

(75) Inventor: Baek-Woon Lee, Yongin-si (KR)

(73) Assignee: Samsung Electronics Co., Ltd. (KR)

( * ) Notice: Subject to any disclaimer, the term of this patent is extended or adjusted under 35 U.S.C. 154(b) by 714 days.

(21) Appl. No.: 12/234,310

(22) Filed: Sep. 19, 2008

(65) Prior Publication Data

US 2009/0086094 A1     Apr. 2, 2009

(30) Foreign Application Priority Data

Oct. 1, 2007 (KR) .................. 10-2007-0098646

(51) Int. Cl.
  *G09G 5/00* (2006.01)
  *G09G 5/02* (2006.01)
  *H04N 9/64* (2006.01)
  *H04N 5/46* (2006.01)
  *H04N 1/46* (2006.01)
  *G03F 3/08* (2006.01)
  *G06K 9/40* (2006.01)
  *G06K 9/00* (2006.01)
  *G06K 9/32* (2006.01)

(52) U.S. Cl. ........ 345/603; 345/589; 345/606; 345/643; 345/690; 348/251; 348/256; 348/557; 348/708; 358/516; 358/519; 358/520; 358/525; 382/167; 382/254; 382/274; 382/300

(58) Field of Classification Search .......... 345/427–428, 345/581, 589–592, 586, 600–601, 606, 618, 345/643, 690; 348/251–256, 278–279, 497, 348/557, 603–606, 649–650, 671, 703, 708, 348/760; 358/516–520, 525; 382/162–167
See application file for complete search history.

(56) References Cited

U.S. PATENT DOCUMENTS

| | | | |
|---|---|---|---|
| 7,176,935 B2 * | 2/2007 | Higgins | 345/589 |
| 2004/0223005 A1 * | 11/2004 | Lee | 345/690 |
| 2006/0231415 A1 * | 10/2006 | Christensen | 205/688 |
| 2006/0274212 A1 * | 12/2006 | Lo et al. | 348/650 |
| 2009/0128694 A1 * | 5/2009 | Yang et al. | 348/453 |

FOREIGN PATENT DOCUMENTS

WO     2005/066700     7/2005

* cited by examiner

*Primary Examiner* — Wesner Sajous
(74) *Attorney, Agent, or Firm* — Innovation Counsel LLP

(57) ABSTRACT

An apparatus for converting three-color image signals to four-color image signals including a white signal comprises a data processor which generates the four-color image signals from the three-color image signals, calculates distortion values associated with conversion to the four-color image signals, and calculates scaling factors from the distortion values, the scaling factors being used to scale image signals in generating the four-color image signals. A method for operating the apparatus is also provided.

25 Claims, 7 Drawing Sheets

APPARATUS AND METHOD OF CONVERTING IMAGE SIGNAL FOR FOUR-COLOR DISPLAY DEVICE

CROSS-REFERENCE TO RELATED APPLICATION

This application claims priority to and the benefit of South Korean Patent Application No. 10-2007-0098646 filed in the Korean Intellectual Property Office on Oct. 1, 2007, the entire contents of which are incorporated herein by reference.

BACKGROUND OF THE INVENTION

This Background section is provided only to help explain some aspects of the invention and therefore may contain information that does not form prior art with regard to this patent application.

(a) Field of the Invention

The present invention relates to an apparatus and a method for converting image signals of a four-color display device.

(b) Description of the Related Art

In recent years, flat panel displays have been developed to replace heavy and large cathode ray tubes (CRTs). Examples of flat panel displays include organic light emitting diode displays (OLEDs), plasma display panels (PDPs), and liquid crystal displays (LCDs).

The PDPs display text and other images using plasma generated by gas discharge. The organic light emitting diode displays display images using field emission of specific organic materials (e.g. polymers). In a liquid crystal display, an electric field is applied to a liquid crystal layer interposed between two display panels. The intensity of the electric field is adjusted to control transmittance of light that passes through the liquid crystal layer, thereby obtaining a desired image.

A color flat panel display generally displays images by combining three primary colors of red, green, and blue, but a white pixel (i.e. without a color filter) is sometimes added to improve the luminance. This is called a four-color flat panel display. In the four-color flat panel display, the three-color image signals are received and converted into four-color image signals to display the image.

Disadvantageously, use of a white pixel may lead to distortion of hue and saturation.

SUMMARY

This section summarizes some features of the present disclosure of invention. Other features are described in the subsequent section. The present disclosure includes subject matter defined by the appended claims, which matter is hereby incorporated into this section by reference.

Some embodiments of the present invention reduce hue and saturation distortion upon converting three-color image signals to four-color image signals. Below, the term "color distortion" will be used to describe distortion of hue and/or saturation, and in particular to describe the hue and saturation distortion when the luminance is increased to take advantage of the white pixel.

Some embodiments provide an apparatus for converting three-color image signals to four-color image signals including a white signal, the apparatus comprising a data processor. The data processor generates the four-color image signals from the three-color image signals, calculates distortion values associated with conversion to the four-color image signals, and calculates scaling factors from the distortion values, the scaling factors being used to scale image signals in generating the four-color image signals.

The scaling factor used for at least one frame may be calculated without using the three-color image signals of the at least one frame but using the three-color image signals of a previous frame.

The data processor may comprise: a four-color signal generator generating the four-color image signals from the three-color image signals; a distortion calculator calculating color distortion values representing distortions of individual colors represented by the three-color image signals; a frame distortion calculator calculating frame distortion values associated with individual frames; and a scaling factor calculator calculating the scaling factors from the frame distortion values and providing the scaling factors to the four-color signal generator.

The four-color signal generator may execute gamma conversion on the three-color image signals to obtain first luminance values, and may scale the first luminance values by using the scaling factors to obtain scaled luminance values.

The four-color signal generator may calculate a maximum value and a minimum value for the first luminance values, calculate a luminance value of the white signal from the maximum value and the minimum value, and obtain second luminance values by subtracting the value of the white signal from the scaled luminance values.

The scaling factor calculator may increase or decrease the scaling factor of a frame depending on the frame distortion value of a previous frame.

The color distortion value for each individual color may be the sum of natural powers of color distortion values associated with distortions of the individual color's primary-color components.

The scaling factor used for at least one frame may be calculated using the three-color image signals of the at least one frame and of a previous frame.

The data processor may comprise: a raw signals generator generating raw signals from the three-color image signals; a distortion calculator calculating color distortion values representing distortion values of primary color components of individual colors in generation of the raw image signals; a frame distortion calculator calculating frame distortion values associated with the raw image signals of individual frames from the distortion values of the primary color components of the individual colors; a frame memory storing the three-color image signals; a four-color signal generator connected to the frame memory and generating the four-color image signals from the three-color image signals; and a scaling factor calculator calculating scaling factors from the frame distortion values and providing the scaling factors to the raw signals generator and the four-color signal generator.

The four-color signal generator may execute gamma conversion on the three-color image signals to obtain first luminance values, may calculate a maximum value and a minimum value for the first luminance values, and may scale the first luminance values by using the scaling factor to obtain scaled luminance values; wherein the four-color signal generator may calculate a luminance value of the white signal from the maximum value and the minimum value, and obtain second luminance values by subtracting the value of the white signal from the scaled luminance values.

In some embodiments, the raw signals generator generates the raw signals for the at least one frame by using the scaling factor calculated using the three-color signals of the previous frame but not using the three-color signals of the at least one frame, and the four-color signal generator generates the four color signals by using the scaling factor calculated using the three-color signals of the at least one frame.

In some embodiments, the raw signals generator executes gamma conversion on the three-color image signals to obtain first luminance values, calculates a maximum value and a minimum value for the first luminance values, and scales the first luminance values using a scaling factor to obtain scaled luminance values.

In some embodiments, the scaling factor calculator increases or decreases the scaling factors depending on the frame distortion values.

In some embodiments, the frame distortion values are calculated from color distortion values for individual colors, and each color distortion value for an individual color is the sum of natural powers of the color distortion values representing distortions of the individual color's primary-color components.

Some embodiments provide a method for converting three-color image signals to four-color image signals including a white signal, the method comprising: generating the four-color image signals from the three-color image signals using one or more scaling factors; calculating distortion values associated with conversion to the four-color image signals; and calculating the one or more scaling factors from the distortion values.

In some embodiments, the scaling factor used for at least one frame is calculated without using the three-color image signals of the at least one frame but using the three-color image signals of a previous frame.

In some embodiments, the generating the four-color image signals from the three-color image signals comprises: executing gamma conversion on the three-color image signals to obtain first luminance values; scaling the first luminance values by using a scaling factor to obtain scaled luminance values; generating a luminance value of the white signal; generating second luminance values from the scaled luminance values and the white signal; executing reverse gamma conversion on the luminance value of the white signal; executing reverse gamma conversion on the second luminance values to obtain raw gray values; and determining whether the raw gray values exceed a maximum gray value.

Some embodiments further comprise calculating a maximum value and/or a minimum value for the first luminance values; wherein the luminance value of the white signal is generated using the maximum value and/or the minimum value; and the second luminance values are generated by subtracting the luminance value of the white signal from the scaled luminance values.

In some embodiments, the scaling factor is changed by $1/N$, where $32 \leq N \leq 1024$.

In some embodiments, generating the distortion values comprises generating distortion values for individual colors, wherein each distortion value of an individual color is the sum of natural powers of distortion values associated with the individual color's primary-color components.

In some embodiments, the scaling factor used for at least one frame is calculated from the three-color image signals of the at least one frame and of a previous frame.

In some embodiments, generating the four-color image signals from the three-color image signals comprises: executing gamma conversion on the three-color image signals to obtain first luminance values; scaling the first luminance values by using a scaling factor to obtain scaled luminance values; generating a luminance value of the white signal; generating second luminance values from the scaled luminance values and the white signal; executing reverse gamma conversion on the luminance value of the white signal; executing reverse gamma conversion on the second luminance values to obtain raw gray values; and determining whether the raw gray values exceed a maximum gray value.

Some embodiments further comprise calculating a maximum value and/or a minimum value for the first luminance values; wherein the luminance value of the white signal is generated using the maximum value and/or the minimum value; and the second luminance values are generated by subtracting the luminance value of the white signal from the scaled luminance values.

In some embodiments, the scaling factor is increased or decreased depending on the distortion values.

In some embodiments, the distortion values comprise an individual color's distortion value calculated as the sum of natural powers of distortion values associated with the individual color's primary-color components.

DESCRIPTION OF SOME EMBODIMENTS

Figure 1:
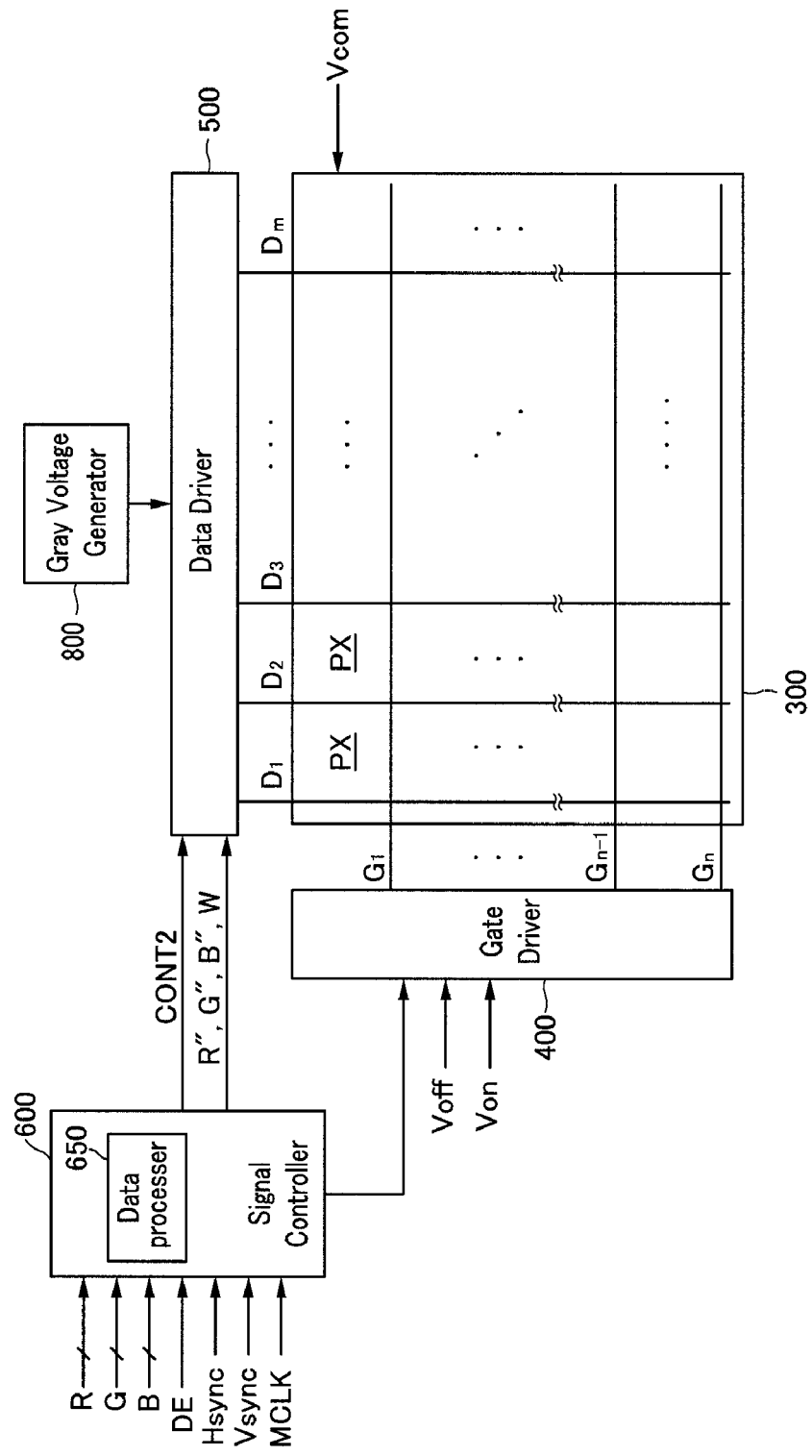
FIG. 1 is a block diagram of a liquid crystal display according to an exemplary embodiment of the present invention.

The present invention is not limited by the exemplary embodiments disclosed in this section. Other embodiments and variations may be within the scope of the present disclosure of invention.

It will be understood that when an element such as a layer, film, region, or substrate is referred to as being "on" another element, it can be directly on the other element or intervening elements may be present. In contrast, when an element is referred to as being "directly on" another element, there are no intervening elements present. Like reference numerals designate like elements throughout the specification.

Figure 2:
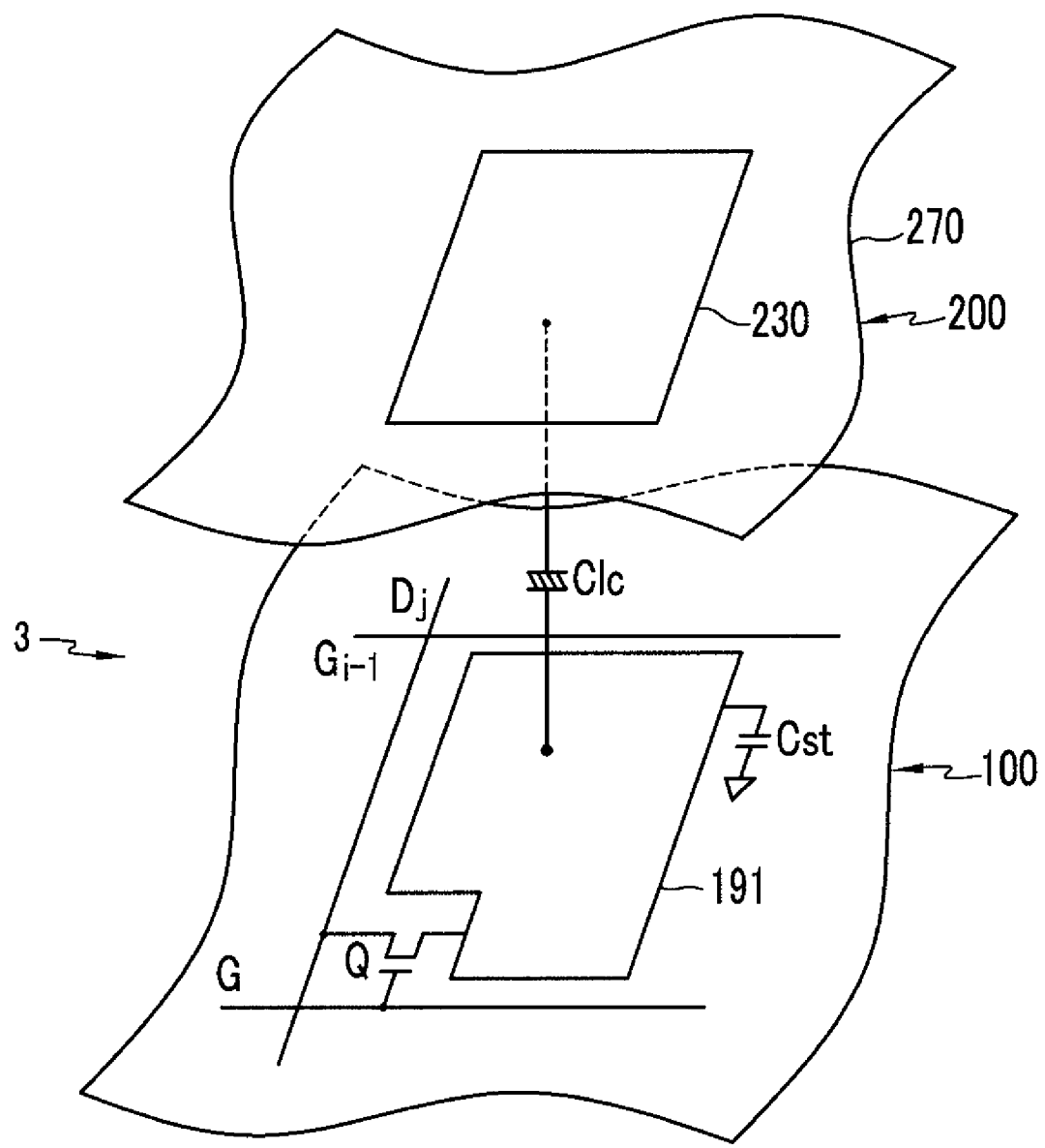
FIG. 2 is a circuit diagram of a pixel of a liquid crystal display according to an embodiment of the present invention.

A liquid crystal display according to an exemplary embodiment of the present invention will now be described with reference to FIGS. 1 and 2. FIG. 1 is a block diagram of the liquid crystal display, and FIG. 2 is a circuit diagram illustrating one pixel of the liquid crystal display.

The liquid crystal display of FIG. 1 includes a liquid crystal panel assembly 300. A gate driver 400 and a data driver 500 are connected to the liquid crystal panel assembly 300. A gray voltage generator 800 is connected to the data driver 500. A signal controller 600 controls the above-described elements.

FIG. 1 illustrates circuit elements of the liquid crystal panel assembly 300. The circuit elements include signal lines $G_1$-$G_n$, $D_1$-$D_m$ and pixels PX connected to the signal lines $G_1$-$G_n$, $D_1$-$D_m$ and arranged substantially in a matrix. FIG. 2 illustrates structural elements of the liquid crystal panel assembly 300, including lower and upper panels 100 and 200 facing each other and also including a liquid crystal (LC) layer 3 between the lower panel 100 and the upper panel 200.

The signal lines $G_1$-$G_n$ are gate lines (also called scanning lines) that transmit gate signals (also called scanning signals), and the signal lines $D_1$-$D_m$ are data lines transmitting data signals. The gate lines $G_1$-$G_n$ extend substantially in a row direction and are substantially parallel to each other, while the data lines $D_1$-$D_m$ extend substantially in a column direction and are substantially parallel to each other.

Referring to FIG. 2, each pixel PX, for example a pixel PX connected to the i-th gate line Gi (i=1, 2, . . . , n) and the j-th data line Dj (j=1, 2, . . . , m), includes a switching element Q connected to the signal lines Gi and Dj and also includes an LC capacitor Clc and a storage capacitor Cst that are connected to the switching element Q. The storage capacitor Cst may be omitted.

The switching element Q is a three terminal element such as a thin film transistor disposed on the lower panel 100. The switching element Q includes a control terminal connected to the scanning line Gi, an input terminal connected to the data line Dj, and an output terminal connected to the LC capacitor Clc and the storage capacitor Cst.

The LC capacitor Clc includes two terminals. One of the terminals is provided by a pixel electrode 191 disposed on the lower panel 100. The other one of the terminals is provided by a common electrode 270 disposed on the upper panel 200. The LC layer 3 disposed between the two electrodes 190 and 270 functions as the capacitor dielectric of the LC capacitor Clc. The pixel electrode 191 is connected to the switching element Q. The common electrode 270 is supplied with a common voltage Vcom. The common electrode 270 covers an entire surface of the upper panel 200. In some embodiments, the common electrode 270 is located on the lower panel 100, and at least one of the electrodes 191 and 270 may be shaped as a bar or a stripe.

The storage capacitor Cst is an auxiliary capacitor for the LC capacitor Clc. The storage capacitor Cst is formed by the pixel electrode 191 overlapping a separate signal line located on the lower panel 100 separated from the pixel electrode 191 by an insulator. The separate signal line is supplied with a predetermined voltage such as the common voltage Vcom. Alternatively, the storage capacitor Cst may be formed by the pixel electrode 191 overlapping an adjacent gate line separated from the pixel electrode 191 by an insulator.

In a color display, each pixel displays a corresponding one of the primary colors ("spatial division") or each pixel displays different primary colors in sequence ("temporal division"), and a spatial or temporal sum of the primary colors is perceived by a viewer as a desired color. An exemplary set of the primary colors is red, green, and blue. FIG. 2 shows an example of the spatial division in which each pixel includes a color filter 230 representing one of the primary colors. The color filter 230 is located on the upper panel 200. The color filter 230 faces the pixel electrode 191. Alternatively, the color filter 230 may be provided over or under the pixel electrode 191 on the lower panel 100.

One or more polarizers (not shown) are attached to outer surfaces of the liquid crystal panel assembly 300.

Referring again to FIG. 1, the gray voltage generator 800 generates a predefined number of gray voltages ("reference gray voltages") available for the pixels PX. The reference gray voltages may include positive and negative voltages with respect to the common voltage Vcom.

The gate driver 400 is connected to the gate lines $G_1$-$G_n$ of the LC panel assembly 300 and applies gate signals to the gate lines $G_1$-$G_n$. Each gate signal may provide a gate-on voltage Von for turning on the switching elements Q and a gate-off voltage Voff for turning off the switching elements Q.

The data driver 500 is connected to the data lines $D_1$-$D_m$ of the LC panel assembly 300. The data driver 500 selects reference gray voltages supplied by the gray voltage generator 800, and applies the selected gray voltages to the data lines $D_1$-$D_m$ as data voltages. In some embodiments, however, the gray voltage generator 800 generates less than all possible data voltages available for the pixels PX, and the data driver 500 divides the gray voltages generated by the voltage generator 800 to generate other desired data voltages.

The signal controller 600 controls the gate driver 400, the data driver 500, and other circuits of FIG. 1.

Each of the circuits 400, 500, 600, and 800 may include at least one integrated circuit (IC) chip mounted on the LC panel assembly 300 or on a flexible printed circuit (FPC) film in a tape carrier package (TCP). The FPC and/or the TCP can be attached to the panel assembly 300. Alternatively, at least one of the circuits 400, 500, 600, and 800 may be integrated into the panel assembly 300 along with the signal lines $G_1$-$G_n$ and $D_1$-$D_m$ and the switching elements Q. Circuits 400, 500, 600, and 800 may be implemented in any number of IC chips and/or discrete components.

The operation of the above-described LCD will now be described in detail.

An external graphics controller (not shown) provides to the signal controller 600 three-color image signals R, G, and B defining an image and also provides input control signals for controlling the display of the image. The three-color image signals R, G, and B include luminance information for each pixel PX. The luminance may have any one of a predetermined number of levels ("gray levels"), e.g., 1024 ($=2^{10}$), 256 ($=2^8$), or 64 ($=2^6$) gray levels. The input control signals include a vertical synchronization signal Vsync, a horizontal synchronization signal Hsync, a main clock signal MCLK, and a data enable signal DE.

On the basis of the input control signals and the three-color image signals R, G, and B, the signal controller 600 generates gate control signals CONT1 and data control signals CONT2, and converts the image signals R, G, and B into four-color image signals R", G", B", and W suitable for the panel assembly 300. The signal controller 600 sends the gate control signals CONT1 to the gate driver 400 and sends the image signals R", G", B", and W and the data control signals CONT2 to the data driver 500. The conversion of the three-color image signals R, G, and B into the four-color image signals R", G", B", and W is performed by a data processor 650 in the signal controller 600 as described in detail below.

The gate control signals CONT1 include a scanning start signal STV for indicating the start of scanning, and also include at least one gate clock signal for controlling the output time of the gate-on voltage Von. The gate control signals CONT1 may further include at least one output enable signal OE for defining the duration of the gate-on voltage Von.

The data control signals CONT2 include a horizontal synchronization start signal STH for indicating the start of transmission of the digital image signals R", G", B", and W for one pixel row; a load signal TP for indicating application of the analog data voltages to the data lines $D_1$-$D_m$; and a data clock signal HCLK. The data control signals CONT2 further include an inversion signal RVS for reversing the polarity of the voltages of the data signals with respect to the common voltage Vcom (hereinafter, the polarity of the voltages of the data signals with respect to the common voltage is referred to as "the polarity of the data signals").

Responsive to the data control signals CONT2 from the signal controller 600, the data driver 500 receives the digital image signals R", G", B", and W for a row of pixels from the signal controller 600, selects the corresponding analog data voltages from the gray voltages corresponding to the respective digital image signals R", G", B", and W, and applies the analog data voltages as the digital image signals DAT to the data lines $D_1$-$D_m$.

The gate driver 400 applies the gate-on voltage Von to a gate line $G_1$-$G_n$ in response to the scanning control signals CONT1 from the signal controller 600, thereby turning on the switching transistors Q connected to the gate line. The data signals applied to the data lines $D_1$-$D_m$ are then supplied to the pixels PX through the activated switching transistors Q.

The difference between the voltage of a data signal (i.e. an analog data voltage) applied to a pixel PX and the common voltage Vcom is a voltage of the LC capacitor Clc of the pixel PX. This will be called a "pixel voltage" herein. The LC molecules in the LC capacitor Clc have orientations depending on the magnitude of the pixel voltage, and the molecular orientations determine the polarization of light passing through the LC layer 3. The polarizer(s) converts the light polarization into light transmittance such that the luminance of the pixel PX corresponds to the "gray" voltage of the data signal.

By repeating this procedure each horizontal period "1H" equal to the period of the horizontal synchronization signal Hsync and also to the period of the data enable signal DE, all gate lines $G_1$-$G_n$ are sequentially supplied with the gate-on voltage Von, thereby applying the data signals to all pixels PX to display an image for one frame.

At the end of the frame and the start of the next frame, the inversion control signal RVS is used to signal the data driver 500 to reverse the polarity of the data signals (which is referred to as "frame inversion"). In some embodiments, the inversion control signal RVS is controlled to reverse the polarity of the data signals a number of times within one frame (for example, if row inversion or dot inversion is desired), or even to simultaneously provide different polarities for different columns of pixels (as in column inversion or dot inversion).

Figure 3:
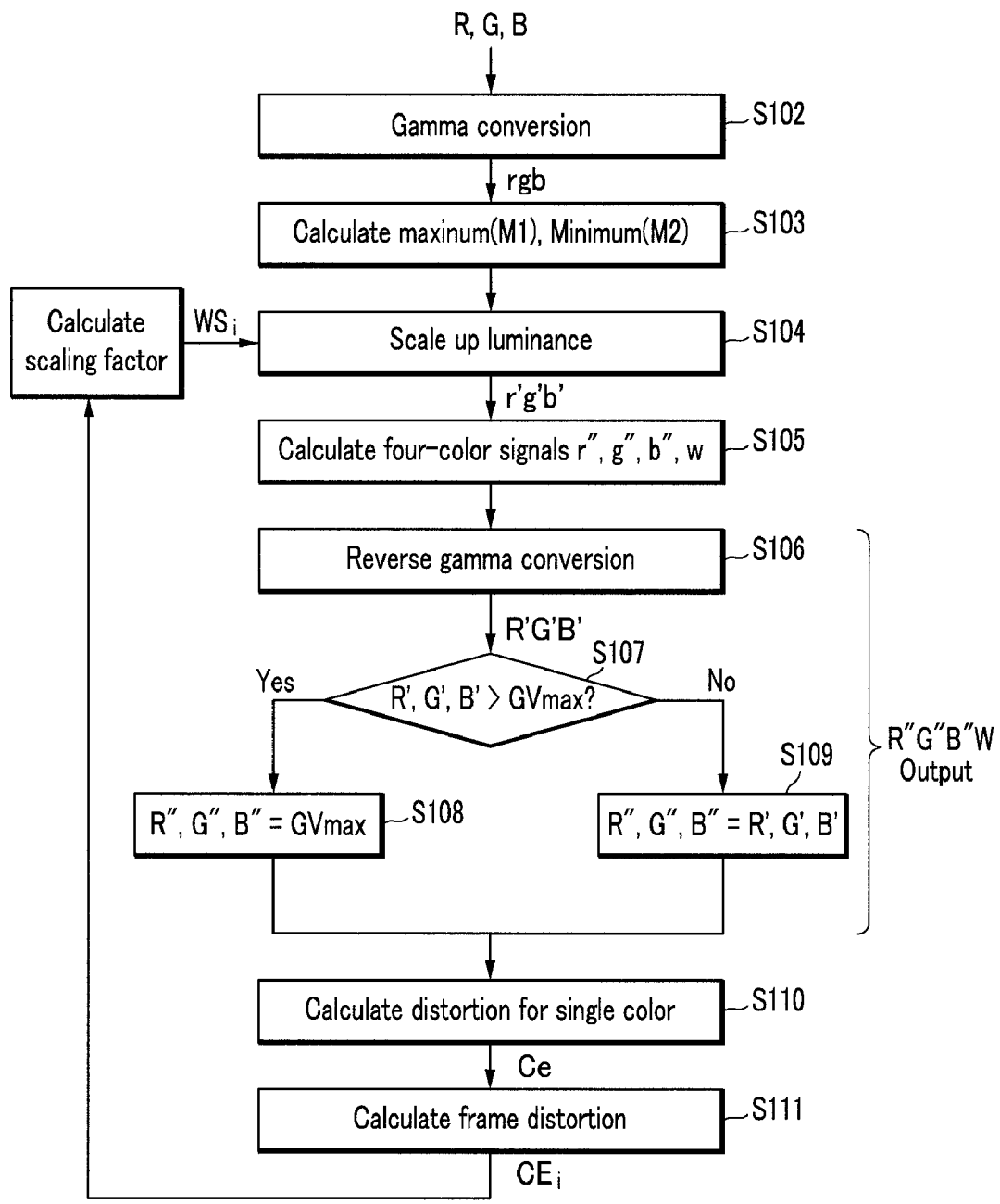
FIG. 3 is a flowchart of a process for converting three-color image signals to four-color image signals according to an exemplary embodiment of the present invention.
Figure 4:
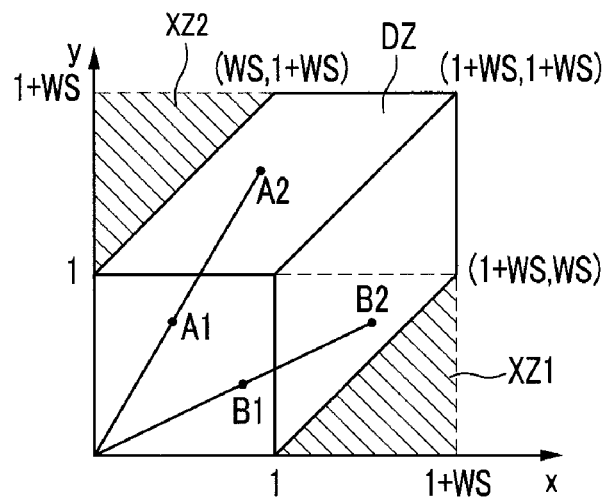
FIGS. 4 to 6 are graphs for explaining methods for converting three-color image signals to four-color image signals according to an exemplary embodiment of the present invention.
Figure 5:
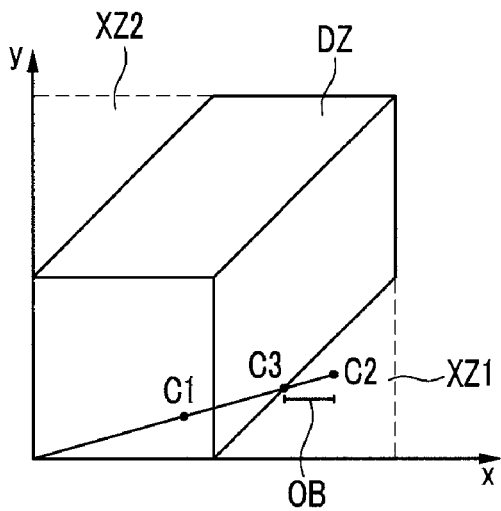
Figure 6:
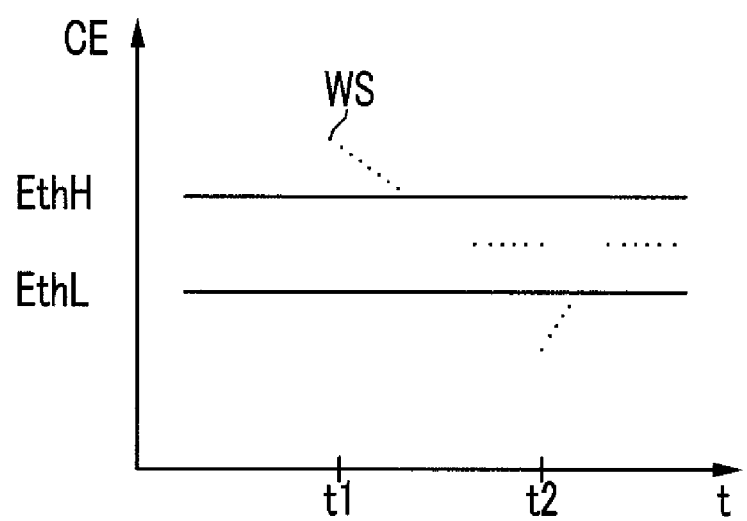

RGB to R"G"B"W conversion of image signals of the liquid crystal display according to an exemplary embodiment of the present invention will now be described with reference to FIGS. 3 to 7. FIG. 3 is a flowchart of the conversion method, and FIGS. 4 to 6 are graphs illustrating some aspects of the conversion method.

At the start of the conversion process of FIG. 3, at step S102, the red, green, and blue image signals having "gray" values R, G, and B are "gamma converted" to corresponding luminance values r, g, b as follows:

$$r = \Gamma(R)$$

$$g = \Gamma(G)$$

$$b = \Gamma(B)$$

where $\Gamma$ is a suitable function. In some embodiments:

$$\Gamma(GV) = \alpha GV^\gamma \quad (1)$$

where GV is the gray value R, G, or B, and $\alpha$ and $\gamma$ are some constants ($\gamma$ is referred to as a gamma constant). The luminance values r, g, b can be used to recover the gray values GV in reverse gamma conversion as follows:

$$GV = \alpha' X^{1/\gamma} \quad (2)$$

where X is r, g or b.

Functions $\Gamma$ other than (1) can be used depending on the substantial gamma curve of the liquid crystal display.

Next (step S103), the maximum and minimum values are calculated of luminance values r, g, and b:

$$M1 = \text{Max}(r, g, b) \quad (3)$$

$$M2 = \text{Min}(r, g, b) \quad (4)$$

Here, Max(x, y, . . . ) means the maximum value among x, y, . . . , and Min(x, y, . . . ) means the minimum value among x, y, . . . .

Next (step S104), the luminance values r, g, b are scaled up via multiplication by $(1+WS_i)$ to obtain scaled luminance values r', g', b' as follows:

$$r' = (1+WS_i)r \quad (5)$$

$$g' = (1+WS_i)g \quad (6)$$

$$b' = (1+WS_i)b \quad (7)$$

where the "scaling factor" $WS_i$ is fixed for each frame i but may vary from frame to frame. The scaling factor $WS_i$ for frame i is calculated using the scaling factor $WS_{i-1}$ for the previous frame as described below. For the very first frame (or some reference frame), the scaling factor $WS_i$ is set to the ratio of total luminance of the red, green and blue components having the maximum luminance to the maximum luminance of the white pixel (it is assumed that the maximum of each luminance r, g, b is 1, but this is not necessary). The coefficient (1+WS) is therefore the maximum luminance of each of the red, green and blue components of a color displayed by one image element consisting of a red pixel, a green pixel, a blue pixel and a white pixel.

FIGS. 4 and 5 provide geometric illustrations of some aspects of the scaling operation. In these figures, the values x and y can be any two of r, g, b. It is assumed that each luminance r, g, b can vary from 0 to 1. Therefore, in the xy charts of FIGS. 4, 5, a three-color input image signal corresponds to a point located in the square region with vertices (0,0), (1,0), (1,1), and (0,1). If this color is represented as a vector with coordinates (r,g,b), then the scaling to r'g'b' involves extending the vector by the factor $(1+WS_i)$. In FIG. 4, the colors A1 and B1 are thus converted to the respective colors A2 and B2.

Later, the r'g'b' luminances will be converted to r"g"b"w luminances for the respective R,G,B,W pixels as explained below in connection with equations (8)-(13).

If the rgb color (i.e. the color represented by the triple (r,g,b)) is close to a pure color (such as pure red, pure green, or pure blue), then the r'g'b' color defined by equations (5)-(7) may be non-reproducible on the LCD if the scaling factor $WS_i$ is large. The set of reproducible colors is shown as a region DZ in FIGS. 4 and 5 and is a hexagonal area with vertices (0,0), (1,0), (1+WS,WS), (1+WS,1+WS), (WS,1+WS), and (0,1). The set of non-reproducible colors is shown as hatched regions XZ1, XZ2. Region XZ1 is a triangular area with vertices (1,0), (1+WS,0), (1+WS,WS). Region XZ2 is a triangular area with vertices (0,1), (0,1+WS), and (WS,WS+1). The r'g'b' color may be in region XZ1 or XZ2.

At step S105, the scaled luminance values r', g', b' are converted to luminance values r", g", b", w for the red pixel, the green pixel, the blue pixel, and the white pixel respectively. The luminance value w is determined as follows. A test is performed to determine if the following condition (8) is satisfied:

$$M1 * WS_i \leq (1+WS_i) * M2 \quad (8)$$

If the condition (8) is satisfied, then:

$$w = M1 * WS_i \quad (9)$$

Otherwise, $$w = M2 * (1+WS_i) \quad (10)$$

In other words, w is set to Min (M1*WS$_i$,(1+WS$_i$)*M2).

Other methods for determining the luminance value w of the white signal can also be used, including, for example, setting w=M2, or using Equation (10) regardless of condition (8).

Next, the luminance values r", g", b" of the red, green, and blue image signals are determined by subtracting w from r', g', b':

$$r''=r'-w \qquad (11)$$

$$g''=g'-w \qquad (12)$$

$$b''=b'-w \qquad (13)$$

Then (step S106) reverse gamma conversion is performed on the luminance values r", g", b", and w of the red, green, blue, and white image signals to obtain the gray value W and "raw" gray values R', G', B' of each of the white, red, green, and blue image signals:

$$R'=\Gamma^{-1}(r'') \qquad (14)$$

$$G'=\Gamma^{-1}(g'') \qquad (15)$$

$$B'=\Gamma^{-1}(b'') \qquad (16)$$

$$W=\Gamma^{-1}(w)$$

Next (step S109), it is determined whether any raw gray values R', G', B' of the red, green, and blue image signals are higher than the maximum gray value GVmax (e.g., GVmax=255 for a gray scale of 256 values). In particular, a test is performed to determine if:

$$R'>GV\max \text{ or} \qquad (17)$$

$$G'>GV\max \text{ or}$$

$$B'>GV\max$$

The values R", G", B" are computed, respectively, as Min (R',GVmax), Min(G',GVmax), Min(B',GVmax).

FIG. 5 illustrates this operation. If any of R', G', B' exceeds GVmax, then the corresponding point r'g'b' was in a non-reproducible area. In the example of FIG. 5, an original color C1 was scaled up at step S104 to a color C2 located in the irreproducible area XZ1. The operation S109 replaces the color C2 with a color C3 in the reproducible area DZ.

Step S109 introduces color distortion. A distortion value Ce for the color is then calculated at step S110 as follows. First, distortion of each of the red, green and blue luminance values is calculated:

$$OBR=\text{Max}(0,R'-GV\max) \qquad (18)$$

$$OBG=\text{Max}(0,G'-GV\max) \qquad (19)$$

$$OBB=\text{Max}(0,B'-GV\max) \qquad (20)$$

These distortion values (18)-(20) are combined to obtain the color distortion Ce for the color being processed (e.g. color C3). Different methods can be used to compute Ce. Some embodiments use the sum of squares:

$$Ce=OBR^2+OBG^2+OBB^2 \qquad (21)$$

In some other embodiments, Ce is the sum of cubes or other powers (perhaps first powers) of OBR, OBG, OBB. Any powers can be used, including natural powers (i.e. positive integer powers).

Steps S101-S110 are performed for each image element of frame i (i.e. each triple of R, G, B input signals). At step S111, the color distortions Ce for individual colors of the image elements of frame i are summed to obtain a frame distortion CE=CE$_i$ for the current frame i:

$$CE_i=\Sigma Ce \qquad (22)$$

Next, the scaling factor WS$_{i+1}$ is obtained at step S112 for the next frame i+1 as follows. The frame distortion CE$_i$ depends on the scaling factor WS$_i$. The larger the scaling factor, the larger the frame distortion. Therefore, if the frame distortion CE$_i$ is large, then the next frame's scaling factor WS$_{i+1}$ is decreased relative to WS$_i$ to reduce the frame distortion CE$_{i+1}$ for the next frame. On the other hand, if the frame distortion CE$_i$ is small, the scaling factor WS$_{i+1}$ is increased to increase the next frame's luminance.

Desired bounds for the frame distortion CE$_i$ can be obtained through experimentation. Of note, an abrupt change of the scaling factor WS$_i$ from frame to frame may cause flicker due to luminance changes. In some embodiments, WS$_i$ is controlled as follows. Desired upper and lower bounds EthH, EthL (FIG. 6) are determined in advance for the frame distortions CE$_i$. At step S112, the scaling factor WS$_{i+1}$ is decreased (relative to WS$_i$) if CE$_i$ exceeds the upper bound (CE$_i$>EthH). WS$_{i+1}$ is increased if CE$_i$ is below the lower bound (CE$_i$<EthL). The scaling factor is unchanged (WS$_{i+1}$=WS$_i$) if CE$_i$ is between the upper and lower bounds (EthH≦CE$_i$≦EthH).

In FIG. 6, the upper bound EthH and the lower bound EthL are represented by solid lines, and the scaling factor WS$_i$ is represented by a dotted line. In the example of FIG. 6, the input three-color image signals R, G, and B include many pure colors at a time t1, so the frame distortion CE=CE$_i$ exceeds the upper bound EthH. Therefore, the scaling factor WS$_i$ gradually decreases. At a later time t2, the input image signals include many achromatic colors, and consequently the frame distortion CE falls below the lower bound EthL. The scaling factor WS$_i$ therefore increases. While the frame distortion CE is between the upper and lower bounds EthL, EthH, the scaling factor WS$_i$ stays unchanged.

In some embodiments, the scaling factor WS$_i$ is changed by 1/N where N is a suitable value:

| | | |
|---|---|---|
| WS$_{i+1}$ = WS$_i$ − 1/N | if CE > EthH | (23) |
| WS$_{i+1}$ = WS$_i$ + 1/N | if CE < EthL | (24) |
| WS$_{i+1}$ = WS$_i$ | if EtthL ≦ CE ≦ EthH | (25) |

In some embodiments, N is in the range of 32 to 1024. The step 1/N may be determined by balancing the goals of obtaining high luminance, reducing flicker and reducing color distortion. If the step 1/N is too large (i.e. N is too small), then the flicker may be unacceptably large, and if the step 1/N is too small (N is too large), then the change in the scaling factor WS$_i$ may be too small to provide perceptible reduction in color distortion or desired increase in luminance.

Steps S102-S111 are then executed for the next frame i+1 with he new scaling factor WS$_{i+1}$. In summary, in each frame, the luminance of the image signal is scaled up using the scaling factor calculated from the previous frame.

Figure 7:
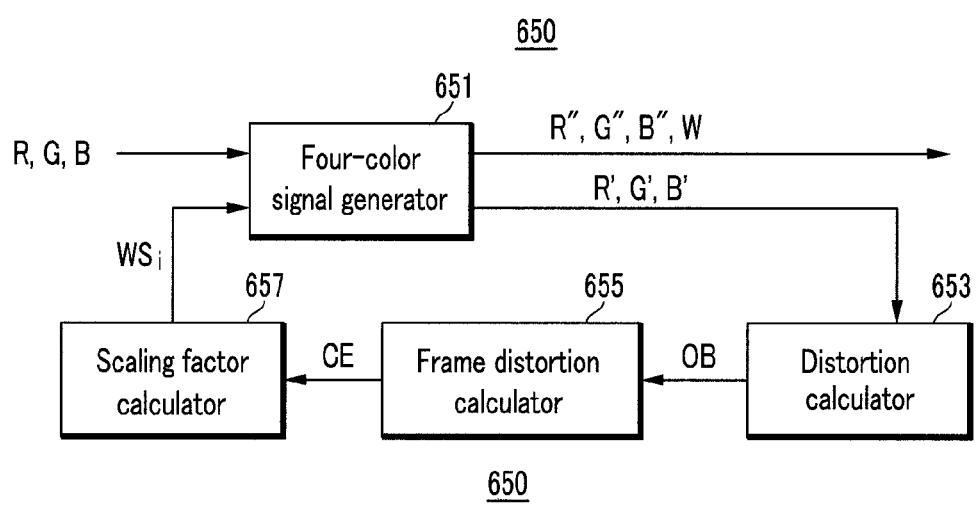
FIG. 7 is a block diagram of one embodiment of a data processor for converting image signals in the liquid crystal display of FIG. 1.

FIG. 7 is a block diagram of one embodiment of data processor 650 of FIG. 1. The data processor 650 includes a four-color signal generator 651, a distortion calculator 653, a frame distortion calculator 655, and a scaling factor calculator 657.

The four-color signal generator 651 performs the gamma conversion step S102 and calculates the maximum and minimum values at step S103. Next, the four-color generator 651 scales up the luminances r, g, b (step S104) using the scaling factor $WS_i$ initialized to WS if frame i is the first frame or some reference frame, or using the scaling factor $WS_i$ generated from the previous frame. The four-color signal generator 651 then performs steps S105, S106, S109.

The distortion calculator 653 calculates the distortion values OB (i.e. OBR, OBG, OBB) for each of the red, green and blue luminances R', G', B' (step S110) and outputs them to the frame distortion calculator 655.

The frame distortion calculator 655 continues execution of step S110 by calculating the color distortion Ce for each image element on the basis of Equation (21). The frame distortion calculator 655 also executes step S111 to calculate the frame distortion $CE_i$ for one frame based on Equation 22.

The scaling factor calculator 657 calculates the scaling factor $WS_{i+1}$ for the next frame from the frame distortion $CE_i$ (Equations (22)-(25) and step SI 12), and provides the scaling factor to the four-color signal generator 651.

In this embodiment, the scaling factor $WS_i$ used for frame i is calculated based on the frame distortion $CE_{i-1}$ in the previous frame and not based on the colors of the frame i. It is preferable for the scaling factor $WS_i$ of the frame i to take into account the image signals of the frame i, as will now be described with reference to FIG. 8.

Figure 8:
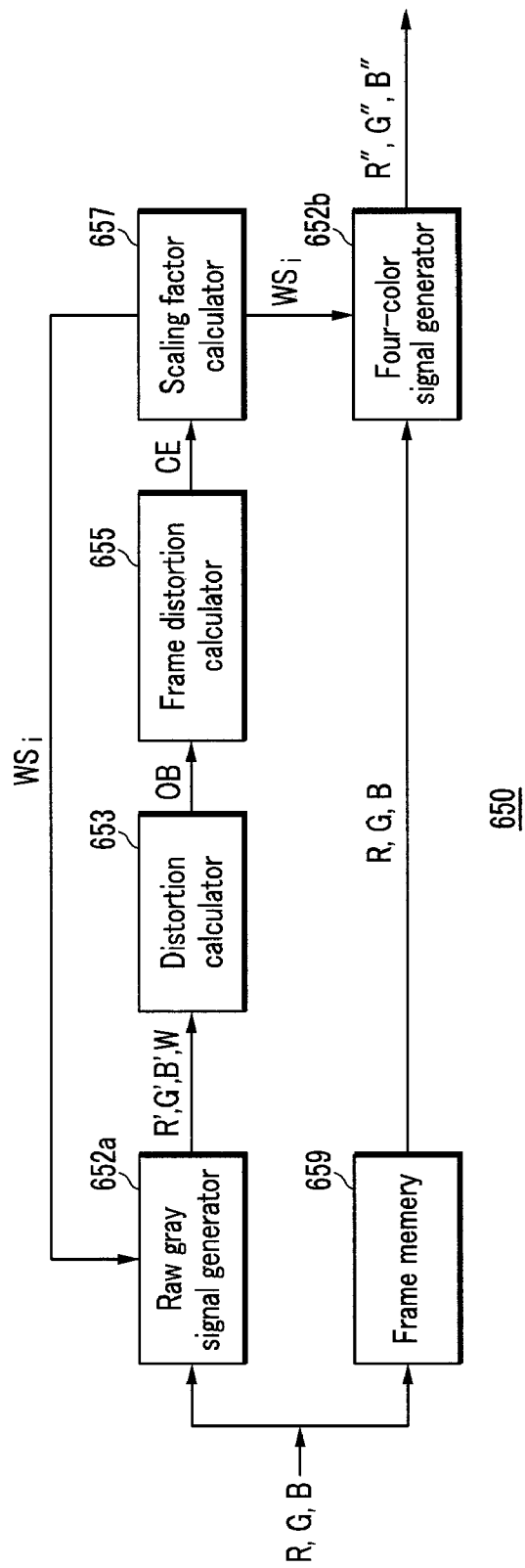
FIG. 8 is a block diagram of another embodiment of a data processor for converting image signals in the liquid crystal display of FIG. 1.

FIG. 8 is a block diagram of one embodiment of data processor 650. The data processor of FIG. 8 includes a frame memory 659, raw gray signals generator 652a, and four-color signal generator 652b (which is similar to the four-color generator 651 of FIG. 7).

The three-color image signals R, G, and B of the current frame i are received by the data processor 650 and provided to the raw gray signals generator 652a. The three-color image signals R, G, B for the frame i are also stored in the frame memory 659.

The raw gray signals generator 652a receives the scaling factor $WS_i$ calculated as in FIG. 7 (based on the previous frame i−1), and generates the raw gray signals R', G', B' by performing suitable operations of steps S102, S103, S104, S105, S106 as described above in connection with FIG. 7. Distortion calculator 653, frame distortion calculator 655, and scaling factor calculator 657 operate as in FIG. 7 to generate the scaling factor $WS_{i+1}$.

Four-color signal generator 652b reads the image signals R, G, B for frame i from frame memory 659, obtains the scaling factor $WS_{i+1}$ generated by the scaling factor calculator 657, and executes steps S102-S109 to generate the four-color signals R", G", B", W for the frame i. The scaling factor $WS_{i+1}$ is calculated based on the current frame i, and therefore color distortion is reduced (if $CE_i$ is high) or the luminance is increased (if $CE_i$ is low).

Statistically, few images consist entirely of pure colors. Accordingly, it is possible to provide increased luminance (and thus to meet the original goal of the four-color display devices) for most images by maximizing the scaling factors $WS_i$, and at the same time the color distortion can be reduced for infrequent images or screen portions with many pure colors by controlling the scaling factor $WS_i$.

The invention is not limited to the embodiments described above.

What is claimed is:

1. An apparatus for converting received three-color image signals to four-color image signals that are usable for displaying corresponding imagery on a prespecified display device as a series of image frames, where the four-color image signals include a white signal, the apparatus comprising a data processor,
   wherein the data processor is configured to generate the four-color image signals from the received three-color image signals,
   wherein the data processor is configured to calculate distortion values associated with conversion of the received three-color image signals to the four-color image signals,
   wherein the data processor is configured to calculate scaling factors from the distortion values, and
   wherein the data processor is configured to use the scaling factors to scale converted versions of the received three-color image signals when generating the four-color image signals.

2. The apparatus of claim 1, wherein the data processor is configured to use, for a current image frame, a scaling factor calculated using converted versions of the received three-color image signals of a previous frame.

3. The apparatus of claim 2, wherein the data processor comprises:
   a four-color signal generator configured to generate the four-color image signals from converted and up-scaled versions of the received three-color image signals;
   a distortion calculator configured to calculate color distortion values representing distortions of individual colors represented by the three-color image signals;
   a frame distortion calculator configured to calculate frame distortion values associated with individual frames; and
   a scaling factor calculator configured to calculate the scaling factors from the frame distortion values and providing the scaling factors to the four-color signal generator.

4. The apparatus of claim 3, wherein the four-color signal generator executes gamma conversion on the three-color image signals to obtain first luminance values, and scales the first luminance values by using the scaling factors to obtain scaled luminance values.

5. The apparatus of claim 4, wherein the four-color signal generator calculates a maximum value and a minimum value for the first luminance values, calculates a luminance value of the white signal from the maximum value and the minimum value, and obtains second luminance values by subtracting the value of the white signal from the scaled luminance values.

6. The apparatus of claim 5, wherein the scaling factor calculator increases or decreases the scaling factor of a frame depending on the frame distortion value of a previous frame.

7. The apparatus of claim 6, wherein the color distortion value for each individual color is the sum of natural powers of color distortion values associated with distortions of the individual color's primary-color components.

8. The apparatus of claim 1, wherein the data processor is configured to use, for a current image frame, a respective scaling factor calculated using converted versions of the received three-color image signals of the present frame and of a previous frame.

9. The apparatus of claim 8, wherein the data processor comprises:
   a raw signals generator configured to generate raw signals from the three-color image signals;
   a distortion calculator configured to calculate color distortion values representing distortion values of primary color components of individual colors in generation of the raw image signals;
   a frame distortion calculator configured to calculate frame distortion values associated with the raw image signals of individual frames from the distortion values of the primary color components of the individual colors;
   a frame memory configured to store the three-color image signals;

a four-color signal generator connected to the frame memory and configured to generate the four-color image signals from the three-color image signals; and a scaling factor calculator configured to calculate scaling factors from the frame distortion values and configured to provide the scaling factors to the raw signals generator and the four-color signal generator.

10. The apparatus of claim 9, wherein the four-color signal generator executes gamma conversion on the three-color image signals to obtain first luminance values, calculates a maximum value and a minimum value for the first luminance values, and scales the first luminance values by using the scaling factor to obtain scaled luminance values;

wherein the four-color signal generator calculates a luminance value of the white signal from the maximum value and the minimum value, and obtains second luminance values by subtracting the value of the white signal from the scaled luminance values.

11. The apparatus of claim 9, wherein the raw signals generator generates the raw signals for the at least one frame by using the scaling factor calculated using the three-color signals of the previous frame but not using the three-color signals of the at least one frame, and the four-color signal generator generates the four color signals by using the scaling factor calculated using the three-color signals of the at least one frame.

12. The apparatus of claim 11, wherein the raw signals generator executes gamma conversion on the three-color image signals to obtain first luminance values, calculates a maximum value and a minimum value for the first luminance values, and scales the first luminance values using a scaling factor to obtain scaled luminance values.

13. The apparatus of claim 12, wherein the scaling factor calculator increases or decreases the scaling factors depending on the frame distortion values.

14. The apparatus of claim 13, wherein the frame distortion values are calculated from color distortion values for individual colors, and each color distortion value for an individual color is the sum of natural powers of the color distortion values representing distortions of the individual color's primary-color components.

15. A machine-implemented method for converting received three-color image signals to four-color image signals that are usable for displaying corresponding imagery on a prespecified display device as a series of image frames, where the four-color image signals include a white signal, the method comprising:

using a data processor for generating the four-color image signals from the received three-color image signals, where said generating includes using one or more predetermined scaling factors;

using the data processor for calculating distortion values associated with the generated four-color image signals where the distortion values arise from use of the scaling factors during conversion of the received three-color image signals to the four-color image signals; and using the data processor for calculating a next-to-be-used one or more scaling factors from the calculated distortion values.

16. The method of claim 15, wherein the data processor is configured to use, for a current image frame, a respective scaling factor calculated using converted versions of the received three-color image signals of a previous frame.

17. The method of claim 16, wherein the generating the four-color image signals from the three-color image signals comprises:

executing gamma conversion on the three-color image signals to obtain first luminance values;

scaling the first luminance values by using a scaling factor to obtain scaled luminance values;

generating a luminance value of the white signal;

generating second luminance values from the scaled luminance values and the white signal;

executing reverse gamma conversion on the luminance value of the white signal;

executing reverse gamma conversion on the second luminance values to obtain raw gray values; and determining whether the raw gray values exceed a maximum gray value.

18. The method of claim 17, further comprising calculating a maximum value and/or a minimum value for the first luminance values;

wherein the luminance value of the white signal is generated using the maximum value and/or the minimum value; and the second luminance values are generated by subtracting the luminance value of the white signal from the scaled luminance values.

19. The method of claim 18, wherein the scaling factor is changed by 1/N, where $32 \leq N \leq 1024$.

20. The method of claim 19, wherein generating the distortion values comprises generating distortion values for individual colors, wherein each distortion value of an individual color is the sum of natural powers of distortion values associated with the individual color's primary-color components.

21. The method of claim 15, wherein the data processor is configured to use, for a current image frame, a respective scaling factor calculated using converted versions of the received three-color image signals of the present frame and of a previous frame.

22. The method of claim 21, wherein generating the four-color image signals from the three-color image signals comprises:

executing gamma conversion on the three-color image signals to obtain first luminance values;

scaling the first luminance values by using a scaling factor to obtain scaled luminance values;

generating a luminance value of the white signal;

generating second luminance values from the scaled luminance values and the white signal;

executing reverse gamma conversion on the luminance value of the white signal;

executing reverse gamma conversion on the second luminance values to obtain raw gray values; and determining whether the raw gray values exceed a maximum gray value.

23. The method of claim 22, further comprising using a data processor for calculating a maximum value and/or a minimum value for the first luminance values;

wherein the luminance value of the white signal is generated using the maximum value and/or the minimum value; and the second luminance values are generated by subtracting the luminance value of the white signal from the scaled luminance values.

24. The method of claim 23, wherein the scaling factor is increased or decreased depending on the distortion values.

25. The method of claim 24, wherein the distortion values comprise an individual color's distortion value calculated as the sum of natural powers of distortion values associated with the individual color's primary-color components.

* * * * *